Jan. 30, 1923.
G. R. MAUPIN.
FLUE CUTTER.
FILED NOV. 7, 1921.
1,443,799.
2 SHEETS—SHEET 2.
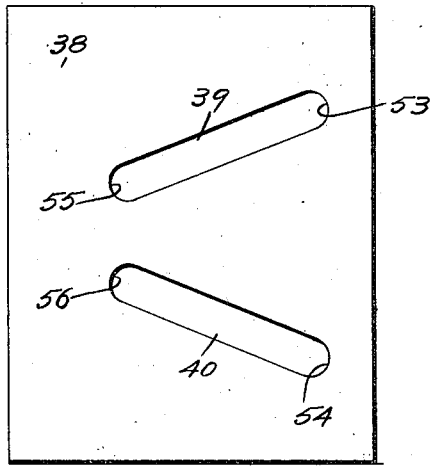
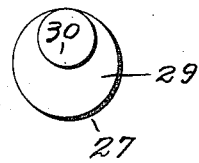
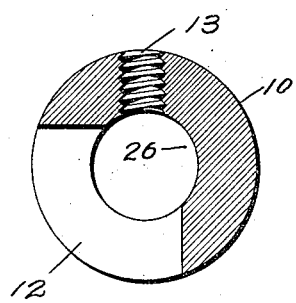
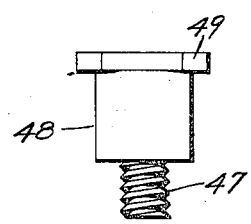
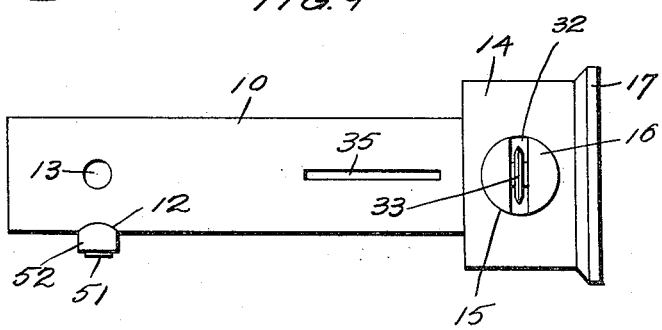
INVENTOR
GRAVES R. MAUPIN
BY Edward E. Longan
ATTY.

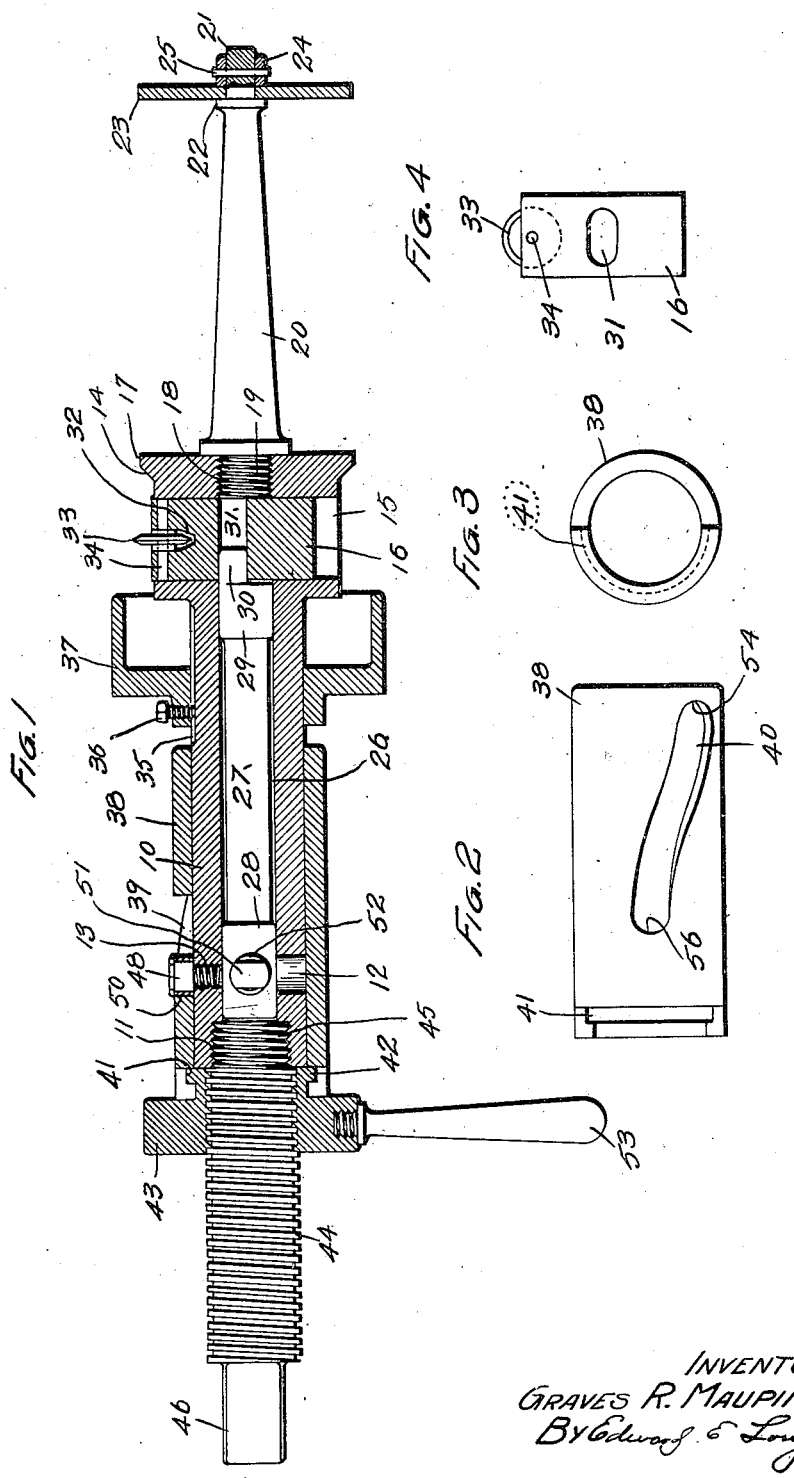

Patented Jan. 30, 1923.

1,443,799

UNITED STATES PATENT OFFICE.

GRAVES R. MAUPIN, OF MOBERLY, MISSOURI, ASSIGNOR TO THE J. FAESSLER MANUFACTURING COMPANY, OF MOBERLY, MISSOURI, A COPARTNERSHIP COMPOSED OF JOHN W. FAESSLER, CHRISTINIA FAESSLER, LOUIS E. FAESSLER, AND GRAVES R. MAUPIN.

FLUE CUTTER.

Application filed November 7, 1921. Serial No. 513,268.

*To all whom it may concern:*

Be it known that I, GRAVES R. MAUPIN, a citizen of the United States, and resident of the city of Moberly, county of Randolph, and State of Missouri, have invented certain new and useful Improvements in Flue Cutters, of which the following is a specification containing a full, clear, and exact description, reference being had to the accompanying drawings, forming a part thereof.

My invention relates to improvements in flue cutters, and has for its primary object a flue cutter which can not only be used for cutting out flues, after they have been installed, for removal, but can also be used to trim off flues to the proper length after installation.

A further object is to construct a flue cutter which is capable of cutting flues on either side of the boiler sheet or head.

A still further object is to construct a flue cutter which has a sensitive feeding device so that the same can be fed while using either hand or power drive.

In the drawings,

Fig. 1 is a side elevation of my device with parts in section, showing the manner of assembling the same.

Fig. 2 a side elevation of the sleeve feed made use of.

Fig. 3 an end elevation of the same.

Fig. 4 an elevation of the cutter carrier.

Fig. 5 a diagrammatic view of the feed sleeve, showing the manner of cutting the feed slots therein.

Fig. 6 an end view of the cutter feed spindle.

Fig. 7 an enlarged cross sectional view of the sleeve which carries the operating parts.

Fig. 8 an enlarged side view of one of the studs.

Fig. 9 a plan view of the sleeve which carries the cutter and its operating parts.

In the construction of my device I employ a sleeve 10. This sleeve is provided at its one end with internal screw threads 11 and adjacent the screw threads with a slot 12 and a screw threaded opening 13.

The end of the sleeve 10, opposite the screw threaded portion, is provided with an enlarged cylindrical portion 14, through which a bore 15 is formed. This bore receiving the cutter carrier 16. The portion 14 is further provided with a flange 17, which acts as a steady rest. The cylindrical portion 14 is provided with internal screw threads 18 which receive the threaded portion 19 of the mandrel 20. The forward end of this mandril is provided with a cylindrical portion 21, terminating in a shoulder 22. Against this shoulder is adapted to rest a washer or disc 23 which further serves to steady the cutter when placed in the flue. The disc 23 is held in position by means of the collar 24 and pin 25. Within the hollow bore 26 of the sleeve 10 is located a cutter feed spindle 27 which is provided adjacent its ends with enlarged cylindrical portions 28 and 29, and formed integral with the cutter feed spindle adjacent the cylindrical portion 29 is a projection or pin 30. This pin is offset as illustrated in Figs. 1 and 6, and is adapted to extend into the slot 31 formed in the cutter carrier 16. The upper portion of the cutter carrier 16 is provided with a slot 32 into which a cutter 33 is placed. This cutter is held in position by means of a pin 34 which passes through the cutter and through the cutter carrier 16. The sleeve 10 is provided with a key-way or slot 35, into which the end of a set screw 36 extends. This set screw being carried by the gage 37. The purpose of this gage being to adjust the depth at which the cutter 33 is inserted in the flue. Placed over the sleeve 10 is a feed sleeve 38, which has cut in its periphery diverging feed slots 39 and 40. The slot 39 governing the movement of the feed sleeve while the slot 40 governs the rotation of the cutter feed spindle. The rear end of the feed sleeve 38 is provided with a groove 41, which is adapted to receive the flange 42 of the feed nut 43. As illustrated in Figs. 1, 2 and 3, that portion of the feed sleeve having the groove 41 has approximately half thereof removed so that the flange 42 can be inserted. The feed nut 43 is placed over the screw threaded spindle 44, which has its one end secured as at 45, so that the same can be secured within the screw threaded portion 11 of the sleeve 10. The opposite end being provided with a portion 46, so that the same can be either secured to a power driving means, or can be hand driven by means of a wrench or similar article. Secured within the bore 13 is the screw threaded end 47 of a stud 48, which has a head 49 arranged with a wrench engaging surface, and placed on the stud 48 is a roller 50, which roller fits in the slot 39. Secured within the portion 28 of the feed spindle 27 is a stud 51, which is surrounded by a similar roller 52. This roller, however, passes through the slot 12 formed in the sleeve 10, and also through the slot 40 formed in the sleeve 38.

It will be noted from Fig. 5 that these slots 39 and 40 converge from their ends 53 and 54, so that the ends 55 and 56 will be close together or terminate approximately at an angle of ninety degrees to each other.

The assembling and operation of my device is as follows:

After the several parts have been machined, the mandril 20 is secured within the screw threaded opening 18. The cutter then secured within the cutter carrier 16 which is placed within the bore 15 formed in the cylindrical enlargement 14. The cutter feed spindle is then inserted in the sleeve 10, so that the pin 30 will extend in the slot 31. The feed nut 43, then placed in position in the feed sleeve 38. This portion of the device is then slipped over the sleeve 10. The feed screw 44 is then inserted through the feed nut 43, and the device secured within the sleeve 10 by means of the threaded portion 45. After this assembling has been accomplished, the gage 37 having been attached prior to the securing of the sleeve 38, the sleeves are so turned as to permit the insertion of the studs 48 and 52. The feed nut 43 backed as far as the ends 53 and 54 of the slots 39 and 40 will allow. This backing will result in the turning of the feed spindle 27 and consequent rotation of the pin 30, which will draw the cutter 33 into the cylindrical portion 14. The tool is then inserted in the flue to the point where the cutting operation is desired to be effected. The feed nut 43 then turned by means of the handle 53 until the cutter 33 contacts with the interior of the flue. A slight pressure is then put on the cutter by means of a further rotation of the feed nut, and then rotary movement imparted to the portion 46, which will rotate the entire device. As the cutter 33 cuts through the flue, the same is expanded by a still further feeding of the feed nut 43. This forces the sleeve 38 forward on the sleeve 10. This forward movement brings the studs 48 and 51 closer together. The stud 48 being secured in the sleeve 10 causes a partial rotation of the sleeve, while the stud 51 being secured in the cutter feed spindle will be rotated, but in the opposite direction. This rotation of the cutter feed spindle is allowed by the slot 12 formed through the sleeve 10. This partial rotation of the feed spindle 27 also moves the pin 30, which in rotating forces the cutter carrier outward and causes the cutter 33 to bite further into the flue. The rate of feeding can be accurately determined by holding the hand on the handle 53, as when the cutter starts to bite, a certain amount of pressure will be felt on the handle. This makes my device very sensitive and it is possible to use either hand or power drive to operate the device. This method of procedure is followed until the flue is cut through, which can be readily determined by the release of resistance on the feed handle 53. After the flue has been cut through, the driving mechanism is stopped, and the feed nut 43 reversed, which will again withdraw the cutter and allow the tool to be removed.

By the use of my device it is possible to insert tubes in a boiler which are longer than ultimately required, and the excess of such length can be readily cut off after the tube has been seated in the boiler.

I may also use my tool for cutting the ends off of tubes which have not been secured within a boiler, although the length of such cutting off is determined by the distance of which the gage can be set back. I have also found by experiment that by using a feed sleeve having two slots cut therein as illustrated, that it is possible to make a much shorter tool than would be required where only one slot is used. Since by using two slots and varying the inclination of these slots toward each other, the rate of feeding can be increased or decreased at will. Furthermore, by the use of my feeding device it is possible to construct a tool that can be used either by hand or power drive.

Having fully described my invention, what I claim is:

1. A flue cutter comprising a sleeve, a cutter carrier located in said sleeve, a cutter mounted in said carrier, a second sleeve having converging slots surrounding the first mentioned sleeve, means for imparting longitudinal movement to the second mentioned sleeve, means projecting through the slots formed in the second mentioned sleeve for feeding the cutter carrier into and out of said first mentioned sleeve and a gauge for regulating the depth of insertion of said cutter within a flue.

2. A flue cutter comprising a sleeve, a cutter carrier located in said sleeve, a cutter mounted in said carrier, a second sleeve having converging slots surrounding the first mentioned sleeve, a feed nut, means projecting through the slots formed in the second mentioned sleeve for feeding the cutter carrier into and out of said first mentioned sleeve and a gauge for regulating the depth of insertion of said cutter within a flue.

3. A flue cutter comprising a sleeve having an enlarged end, a cutter carrier slidably located in said enlarged end, a cutter feed spindle located in said sleeve and engaging with the cutter carrier, a second sleeve having converging slots located on the first mentioned sleeve, a roller carried by the feed spindle and projecting through the first mentioned sleeve and into one of said slots in the second mentioned sleeve, a roller secured to the first mentioned sleeve and projecting into the remaining slot of the second mentioned sleeve, means for feeding the second mentioned sleeve backward and forward on the first mentioned sleeve, and means for rotating the first mentioned sleeve.

4. A flue cutter comprising a sleeve having an enlarged end, a cutter carrier slidably located in said enlarged end, a cutter feed spindle located in said sleeve and engaging with the cutter carrier, a second sleeve having converging slots located on the first mentioned sleeve, a roller carried by the feed spindle and projecting through the first mentioned sleeve and into one of said slots in the second mentioned sleeve, a roller secured to the first mentioned sleeve and projecting into the remaining slot of the second mentioned sleeve, means for feeding the second mentioned sleeve backward and forward on the first mentioned sleeve, a gauge adjustably carried by the first mentioned sleeve for limiting the depth of insertion of the cutter in a flue, and means for rotating the first mentioned sleeve.

5. A flue cutter comprising a sleeve, a cutter carrier mounted in said sleeve, a feed spindle located in the sleeve for feeding said cutter carrier into and out of the sleeve, a second sleeve having converging slots slidably mounted on said first mentioned sleeve, separate means carried by the feed spindle anl first mentioned sleeve adapted to be operated by the slots in the second mentioned sleeve whereby the cutter carrier is fed into and out of the sleeve, and means for slidably operating the second mentioned sleeve.

6. A flue cutter comprising a sleeve, a cutter carrier mounted in said sleeve, a feed spindle located in the sleeve for feeding said cutter carrier into and out of the sleeve, a second sleeve having converging slots slidably mounted on said first mentioned sleeve, separate means carried by the feed spindle and first mentioned sleeve adapted to be operated by the slots of the second mentioned sleeve whereby the cutter carrier is fed into and out of the sleeve, means for rotating the cutter, and means for operating the second mentioned sleeve.

7. A flue cutter comprising a sleeve, a cutter carrier mounted in said sleeve, a feed spindle located in the sleeve for feeding said cutter carrier into and out of the sleeve, a second sleeve having converging slots slidably mounted on said first mentioned sleeve, separate means carried by the feed spindle and first mentioned sleeve adapted to be simultaneously operated by the slots of the second mentioned sleeve whereby the cutter carrier is fed into and out of the sleeve, means for rotating the cutter, means for slidably operating the second mentioned sleeve, and an adjustable gauge for limiting the depth of insertion of the cutter.

8. A flue cutter comprising a sleeve, a cutter carrier mounted in said sleeve, a feed spindle located in the sleeve for feeding said cutter carrier into and out of the sleeve, a second sleeve having converging slots slidably mounted on said first mentioned sleeve, separate means carried by the feed spindle and first mentioned sleeve adapted to engage with and be operated by the slots in said second mentioned sleeve whereby the cutter carrier is fed into and out of the sleeve, means for slidably operating the second mentioned sleeve, and an adjustable gauge for limiting the depth of insertion of the cutter.

In testimony whereof, I have signed my name to this specification.

GRAVES R. MAUPIN.